No. 632,133. Patented Aug. 29, 1899.
H. G. MANNING.
SAW TOOL.
(Application filed Apr. 28, 1899.)
(No Model.)
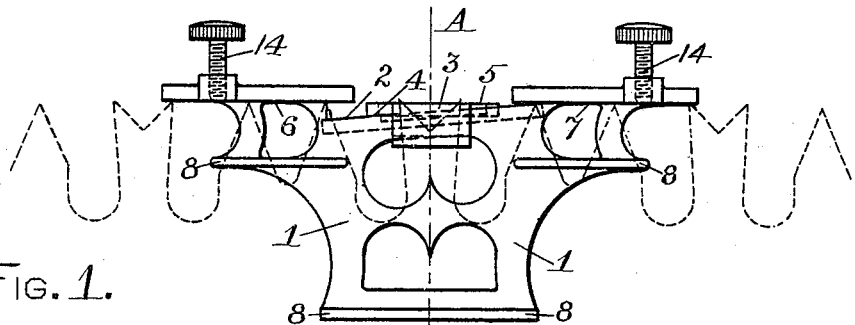
Fig. 1.
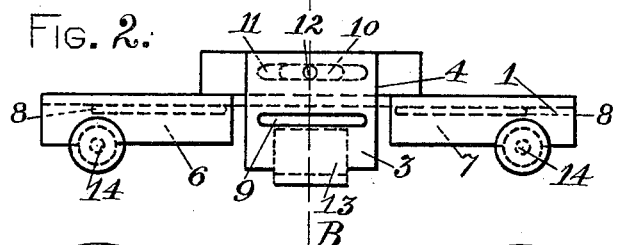
Fig. 2.
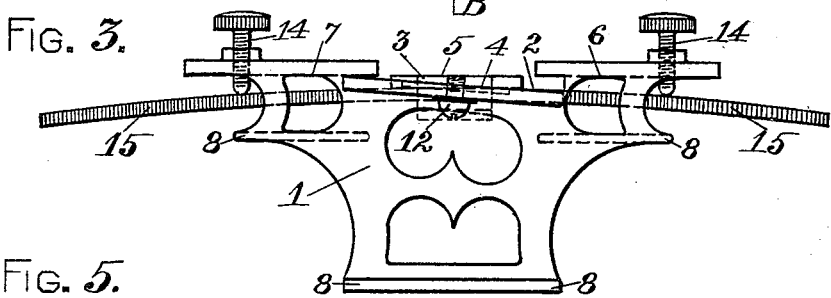
Fig. 3.
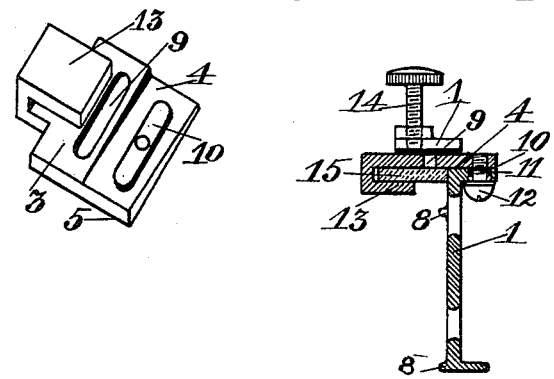
Fig. 5.
Fig. 4.
WITNESSES;
W. L. Hanson,
M. K. Harris.
INVENTOR;
Harry G. Manning

UNITED STATES PATENT OFFICE.

HARRY G. MANNING, OF FITCHBURG, MASSACHUSETTS.

SAW-TOOL.

SPECIFICATION forming part of Letters Patent No. 632,133, dated August 29, 1899.

Application filed April 28, 1899. Serial No. 714,923. (No model.)

*To all whom it may concern:*

Be it known that I, HARRY G. MANNING, a citizen of the United States, residing at Fitchburg, in the county of Worcester and State of Massachusetts, have invented a new and useful Saw-Tool, of which the following is a specification.

The invention relates to improvements in saw-tools used in adjusting cross-cut saws.

The object of the invention is to provide a simple, inexpensive, and efficient tool which can be readily and quickly adjusted to perform the different operations for which it is to be used—namely, the proper filing of what is known as the "raker" or "cleaner" tooth and the jointing or breasting of the cutting-teeth.

The invention consists in the construction and arrangement of the parts fully described and explained in the following drawings and specification.

In the drawings, Figure 1 is a side elevation. Fig. 2 is a top plan. Fig. 3 is a side elevation showing the reverse of Fig. 1. Fig. 4 is a section through line A B of Figs. 1 and 2. Fig. 5 is a perspective of under side of slide.

The same numeral designates the same part on all the figures.

1 is the body of the tool, made preferably a casting, having the inclined surface 2, on which moves the slide 3, said slide 3 having an inclined surface 4, conforming to the inclined surface 2. The upper surface 5 of slide 3 is made parallel to the straight surfaces 6 and 7 of body 1, the teeth of saw resting against surfaces 6 and 7, as shown by dotted lines in Fig. 1. Ribs 8 are raised slightly from the body 1, thus allowing body to have a bearing on side of saw, said ribs being square with surfaces 6 and 7 and in such a position as to allow raker-tooth to pass through slot 9 in slide 3. Slide 3 is provided with the lip 10, projecting from its inclined surface 4, said lip 10 engaging and moving in groove 11 of body 1. Tapped into lip 10 of slide 3 is screw 12, which provides means for clamping slide 3 in any position desirable. On slide 3 is formed the hook portion 13, which is used to support the center of a file 15 when placed in the position shown in Figs. 3 and 4. With the file in this position screws 14 are brought down on each end of file, giving to the file a curvature corresponding to the curve in the tooth-line of the saw, thus adjusting the file for jointing or breasting the teeth.

The saw-tool is used in the following manner: When it is desired to file the raker-teeth to any common depth below the cutting-teeth, file 15 is removed and screws 14 unscrewed until their points are above surfaces 6 and 7. The slide 3 is then adjusted to the desired location and the cutting-teeth placed against surfaces 6 and 7, with the ribs 8 against side of saw, as shown in Fig. 1. In this position the points of raker-teeth will project through slot 9 in slide 3, as shown in Fig. 1. These projecting points are then dressed off by filing down to the hardened surface of slide 3. Moving slide 3 to the left will allow raker-tooth to be filed deeper. Moving slide 3 to the right will allow raker-tooth to be filed a lesser amount. In jointing or breasting a saw file 15 is held in tool, as shown in Figs. 3 and 4, and simply run over tops of teeth to make them all of same height.

The saw-tool as thus made has the following advantages: In filing the raker-teeth it is necessary to have a firm support for the file to resist the downward pressure of filing. As the raker-teeth are filed off to different heights it is necessary to adjust the slide vertically, and this is done on the above-described tool by moving slide horizontally on the inclined surfaces. When the slide is clamped to the body for any desired height of raker, the downward pressure of filing has no tendency to dislocate the slide. In tools in common use for this purpose the method of adjustment is strictly vertical and the downward pressure in filing disarranges the slide, giving more height on some raker-teeth than on others and making an imperfect saw.

A further advantage is the holding of the file square with the saw when breasting.

In the saw-tool above described the file is held in the center of its length, and the two screws at the ends of tool bearing down centrally on the file give it the proper curve, while holding it square with the body of saw.

The slide 3 is preferably made of a metal which can be hardened to resist the abrasion of the file.

I do not desire to hold to the precise form, proportion, or minor details of construction, which can be varied without departing from the advantages of this invention.

Having thus described my invention, what I claim, and desire Letters Patent for, is—

1. In a saw-tool, slide 3 having adjusting-screw 12, adjusting-lip 10, tooth-slot 9, file-clamp 13, inclined surface 4, and flat surface 5, substantially as shown and described.

2. In a saw-tool, slide 3 having adjusting-screw 12, adjusting-lip 10, tooth-slot 9, file-clamp 13, inclined surface 4, flat surface 5 in combination with body 1 and set-screws 14, substantially as shown and described.

3. In a saw-tool the combination of body 1, having inclined surface 2, and straight surfaces 6 and 7, with a slide 3 having inclined surface 4 conforming to inclined surface 2 on body 1, together with slide 3 having straight surface 5 parallel to straight surfaces 6 and 7 on body 1 substantially as shown and described.

4. A saw-tool having a body 1, with ribs 8 square with straight surfaces 6 and 7, inclined surface 2, slot 11, slide 3, with inclined surface 4 and straight surface 5, lip 10, screw 12 and hook 13, in combination with set-screws 14, substantially as shown and described.

HARRY G. MANNING.

Witnesses:
W. L. HANSON,
M. K. HARRIS.